United States Patent [19]

Schaeperkoetter

[11] 3,894,285

[45] July 8, 1975

[54] SPECTRUM DIFFERENTIAL NOISE SQUELCH SYSTEM

[75] Inventor: Louis Carl Schaeperkoetter, McMurray, Pa.

[73] Assignee: RCA Corporation, New York, N.Y.

[22] Filed: June 24, 1974

[21] Appl. No.: 482,630

[52] U.S. Cl. .................................. 325/348; 325/478

[51] Int. Cl. .............................................. H04b 1/10

[58] Field of Search ........... 325/313, 319, 323, 371, 325/377, 348, 402, 456, 473–477, 478, 65; 179/1 P, 1 VL; 328/167

[56] References Cited

UNITED STATES PATENTS

| | | | |
|---|---|---|---|
| 2,802,939 | 8/1957 | Klehfoth | 325/478 |
| 3,102,236 | 8/1963 | Eichenberger et al. | 325/478 |
| 3,213,372 | 10/1965 | Kurvits | 325/478 |
| 3,660,765 | 5/1972 | Glasser et al. | 325/478 |
| 3,805,166 | 4/1974 | Paredes | 325/478 |

*Primary Examiner*—Robert L. Griffin
*Assistant Examiner*—Jin F. Ng
*Attorney, Agent, or Firm*—Edward J. Norton; Robert L. Troike

[57] ABSTRACT

A spectrum differential noise squelch system in which squelch control at the output of a discriminator in an FM receiver is based on the difference between the noise level over one baseband frequency spectrum as compared to the noise level over a second different baseband frequency spectrum. The noise levels at the two frequency spectrums sensed at the output of the discriminator are compared to control the noise squelch system.

5 Claims, 3 Drawing Figures

SPECTRUM DIFFERENTIAL NOISE SQUELCH SYSTEM

BACKGROUND OF THE INVENTION

This invention relates to noise squelch systems in FM receivers and, more particularly, to a spectrum differential noise squelch system using sensed noise levels within two separated frequency spectrums at the output of the discriminator in the receiver.

Typical noise squelch systems in an FM receiver with a bandpass filter in the IF section just prior to the discriminator operate to detect the noise level at the high end of the 6 db passband of the IF filter. This detected noise level is then compared to a DC reference level to squelch the receiver only when the noise level exceeds the DC reference level. These and other known squelch systems have one or more of the following problems:

1. sensitivity to supply voltage variations;
2. temperature variations;
3. variable operating sensitivity;
4. gain variations;
5. sensitivity to discriminator drive levels; and
6. voice blocking or clipping.

BRIEF DESCRIPTION OF THE INVENTION

Briefly, a noise squelch for use in an FM receiver of the type which includes a bandpass filter having 6 db points defining a signal bandwidth prior to the discriminator is provided. The noise squelch includes means coupled to an output of the discriminator for respectively sensing the noise levels of each of two separate frequency bands. The first frequency band sensed is a band of frequencies at baseband centered at a certain frequency lower than the value of the frequency bandwidth of the previously mentioned bandpass filter located prior to the discriminator. The second frequency band sensed includes a range of frequencies above the frequencies in the first frequency band. A comparator means is coupled between the two sensing means and an audio signal channel beyond the discriminator for forwarding or squelching the output signal from the discriminator in response to the value of the difference in the noise levels of the first and the second frequency bands.

DETAILED DESCRIPTION

A more detailed description follows in conjunction with the following drawings wherein.

Figures 1, 2:
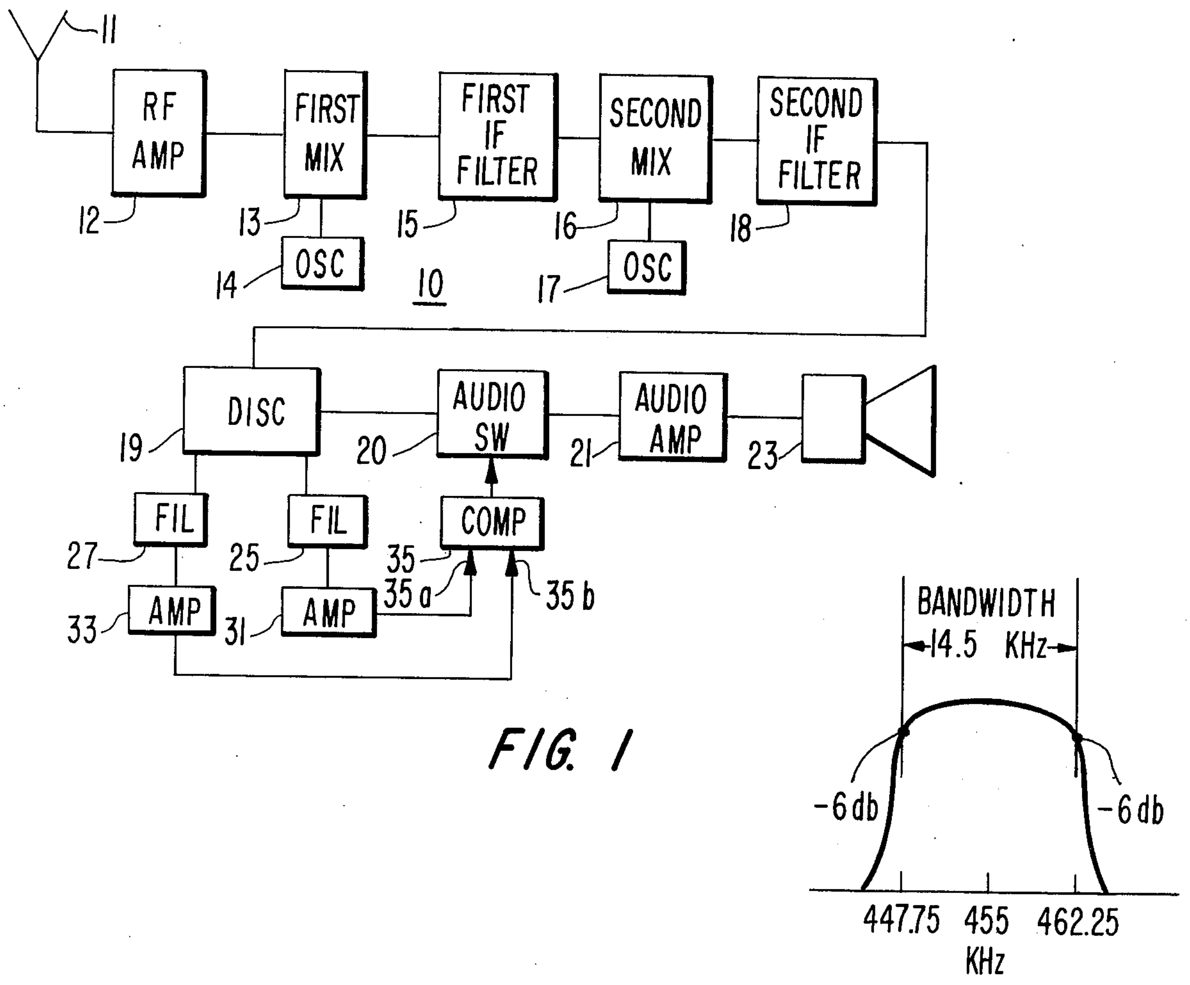
FIG. 1 is a block diagram of an FM receiver with the improved squelch system of the present invention.
FIG. 2 is a sketch illustrating the output bandpass characteristic of the bandpass filter in FIG. 1 located just prior to the discriminator.

Referring to FIG. 1, there is illustrated a receiver 10 of the type used, for example, in mobile radio communication systems. The antenna 11 of the receiver 10 receives radio frequency signals communicated thereto from a remote source and couples these radio frequency signals to a radio frequency amplifier 12 where they are amplified and coupled to the first mixer stage 13. The local oscillator 14 provides a signal differing from the desired incoming RF signal by a fixed amount to develop the first intermediate frequency which may be on the order of 8 MHz. From the first mixer 13, the signal is fed through a first filter 15 to a second mixer 16 where the signal is then beat down to the order of 445 KHz by a fixed signal from local oscillator 17. The signal now at 455 KHz may be passed through a highly selective bandpass filter 18 centered at 455 KHz and having a 6 db bandwidth of 14.5 KHz, for example. The term 6 db bandwidth defines that band of frequencies which is no greater than 6 db below the center frequency of 455 KHz in amplitude, taking into account insertion loss. See FIG. 2. Domodulation occurs at discriminator 19 with the resulting signals being coupled through an audio switch 20 and applied to an audio amplifier 21. The amplified audio at the amplifier 21 may then be coupled to a speaker 23 to render the signal audible.

Figure 3:
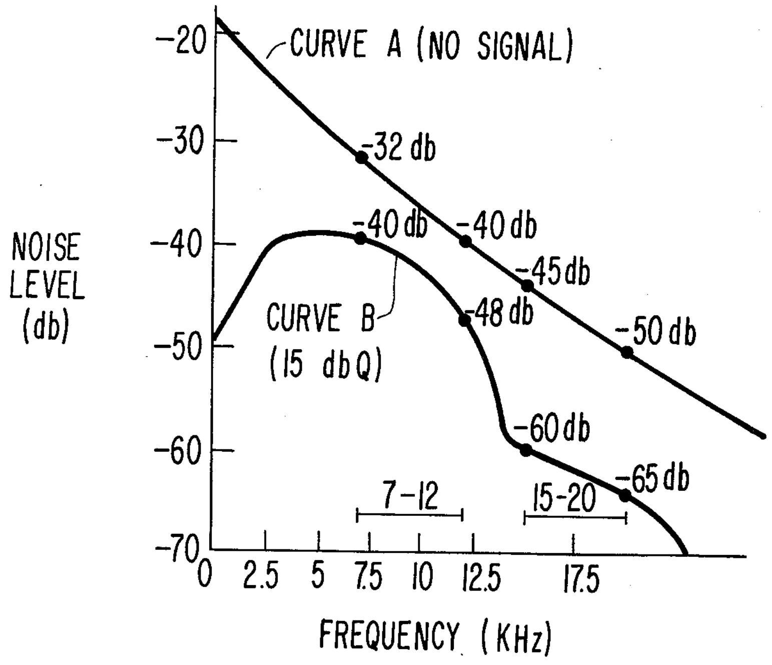
FIG. 3 is a plot of discriminator noise versus frequency.

Turning to the output of the discriminator 19 and considering FIG. 3, there is illustrated a curve A representing the detected noise output from the discriminator with no signal received. Curve B represents the detected noise output from the discriminator with a detected audio signal of sufficient strength to produce 15 db of noise quieting at about 2.5 KHz of the discriminator output, derived by comparing curves A and B at about 2.5 KHz. It will be noted (from FIG. 3) that because of the demodulating operation of the discriminator 19, the frequency scale shifts at the output of discriminator 19 to baseband frequencies. A signal providing 15 db quieting is generally considered one of the minimum signal conditions for operating the receiver. It is to be noted with reference to curve A that the detected noise output at baseband frequencies from the discriminator under no-signal condition decreases almost linearly with increase in frequency. For example, assume that one senses a 5 KHz (kilohertz) band of frequencies centered at about 9.5 KHz; that is centered at about 0.65 of the bandwidth (14.5 KGz) of the bandpass filter 18 defined by the 6 db points. The noise level over this 7–12 KHz band of frequencies varies from about −32 db to about −40 db. At frequencies over a second 5 KHz band of frequencies centered at about 17.5 KHz, that is 1.2 times the bandwidth (14.5 KHz) of filter 18 defined by the 6 db points, for example, the signal level varies from −45 db to about −50 db. It is also to be noted that, in addition to this almost linear decrease in noise level with increasing frequency, the noise level over the 15–20 KHz frequency band drops about 13 to 10 db below the noise level over the 7–12 KHz frequency band.

Turning to curve B, which as mentioned above is a plot of noise level with a signal of sufficient strength to cause 15 db of noise quieting (15 DBQ), the noise level with 15 db quieting in the frequency band of 7–12 KHz varies from −40 to −48 db and the noise level in the frequency band of 15–20 KHz varies from −60 to −65 db. Not only has the noise level been substantially reduced as is well known in the art, but is is to be noted that the noise level drops more drastically at the high frequency end of the spectrum. At the 15–20 KHz frequency region, in the example given, the noise level over the band with 15 db quieting is 17 to 20 db below the noise level which occurs in the 7–12 KHz frequency band. This increase in the relative drop in noise level can be used as taught herein for determining the received signal level.

Returning to the output of discriminator 19, there is, in addition to an output to audio switch 20, a detected baseband output to a first narrow band filter 25 and a second narrow band filter 27. The filter 25 in this case is designed to pass noise signals at baseband frequencies of about 7–12 KHz. The center frequency is generally at about 9.5 KHz or at about 0.65 of the 6 db bandwidth (14.5 KHz) of the bandpass filter 18. The second filter 27 is designed to pass noise signals at baseband frequencies of 15 to 20 KHz. In this case, the center frequency is about 17.5 KHz or at about 1.2 times the 6 db bandwidth (14.5 KHz) of the filter 18. Filters 25, 27 may be any one of the known active or passive filter types. The output of filter 25 is coupled to amplifier 31 and to a first terminal 35*a* of a differential comparator 35. The output from filter 27 is coupled to amplifier 33 and to a second terminal 35*b* of comparator 35. The amplifiers 31 and 32 may each provide equal gain to the sensed noise signals. These signals could also be rectified. The noise levels of the two signals are compared at comparator 35. If the value of the difference in noise level between the two passed frequency bands is less than 14 db, for example, only noise and/or only an unusable signal is deemed present at the discriminator output. Under these conditions, the audio switch 20 is opened, in response thereto, disconnecting the audio amplifier 21 and the speaker from the discriminator output to squelch the receiver 10. If the value of the difference in the sensed noise level between the two frequency bands is 14 db or more, for example, a usable signal is deemed present and the audio switch 20 is closed, in response thereto, unsquelching the receiver output.

It may be desirable to equalize the gain at comparator terminals 35*a* and 35*b*, rather than providing some form of offset at the comparator 35. This may be accomplished by properly adjusting the gain of amplifier 31 relative to the gain of amplifier 33 or by sufficiently attenuating the signal at amplifier 31. It may also be desirable to limit the bandpass of filters 25 and 27 to ±1 KHz to provide even sharper monitoring of the significant drop in noise level at those baseband frequencies above the 14.5 KHz bandwidth of the filter 18.

What is claimed is:

1. A noise squelch system for use in a receiver of the type having a discriminator for detecting intelligence signals coupled to the output of a bandpass filter having upper and lower frequency 6 db points defining a frequency bandwidth comprising:

first means coupled to said discriminator output for sensing the noise level over a first band of baseband frequencies centered at a frequency lower than the value of said frequency bandwidth and second means coupled to said discriminator output for sensing the noise level over a second separate band of baseband frequencies centered at a frequency higher than the value of said frequency bandwidth, and means including comparator means coupled between said first and second sensing means at the output of said discriminator for squelching the output signal from the discriminator when the difference in the noise levels over said first and second bands of baseband frequencies is below a given value, and for passing the output signal from the discriminator when said difference is above said given value.

2. The combination claimed in claim 1 wherein said first band of baseband frequencies is a narrow band compared to the bandwidth of said bandpass filter and is centered at a frequency approximately 0.65 times the value of said frequency bandwidth of said bandpass filter.

3. The combination claimed in claim 1 wherein said second band of frequencies is a narrow band of frequencies compared to the bandwidth of said bandpass filter and includes a frequency approximately 1.2 times the value of said frequency bandwidth of said bandpass filter.

4. The combination claimed in claim 1 wherein said second band of frequencies is centered at a frequency approximately 1.2 times the value of said frequency bandwidth of said bandpass filter.

5. In a receiver of the type having a discriminator coupled to the output of a bandpass filter for detecting intelligence signals and a means for coupling the intelligence signals at the output of the discriminator to a utilization device for said intelligence signals, said bandpass filter having upper and lower frequency 6 db points defining a frequency bandwidth, a noise squelch system comprising:

control means coupled between said discriminator and said utilization device for disrupting the coupling of said intelligence signals and noise to said utilization device;

a comparator coupled to said control means;

means coupled between the output of said discriminator and said comparator for coupling noise signals at baseband frequencies above the intelligence signals and at frequencies centered at about 0.65 times the value of said frequency bandwidth of said bandpass filter to said comparator;

means coupled between the output of said discriminator and said comparator for coupling noise signals at baseband frequencies centered at about 1.2 times the value of said frequency bandwidth of said bandpass filter to said comparator, and said comparator being responsive to a given value of difference in the noise level at frequencies centered at 0.65 times the value of said frequency bandwidth of said bandpass filter relative to the noise level at frequencies centered at 1.2 times the value of said frequency bandwidth of said bandpass filter for operating said control means to determine the coupling of said intelligence signals to said utilization device.

* * * * *